(12) United States Patent
Arif Khan et al.

(10) Patent No.: US 11,361,044 B2
(45) Date of Patent: Jun. 14, 2022

(54) EVENT-BASED SEARCH ENGINE

(71) Applicant: EMC IP Holding Company LLC, Hopkinton, MA (US)

(72) Inventors: Falaah Arif Khan, Hyderabad (IN); Tousif Mohammed, Bangalore (IN); Shubham Gupta, Jaipur (IN); Hung The Dinh, Austin, TX (US); Ramu Kannappan, Frisco, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 128 days.

(21) Appl. No.: 16/752,775

(22) Filed: Jan. 27, 2020

(65) Prior Publication Data
US 2021/0232652 A1     Jul. 29, 2021

(51) Int. Cl.
*G06F 16/9537* (2019.01)
*G06N 20/00* (2019.01)
*G06F 16/2457* (2019.01)

(52) U.S. Cl.
CPC .... *G06F 16/9537* (2019.01); *G06F 16/24578* (2019.01); *G06N 20/00* (2019.01)

(58) Field of Classification Search
CPC ............. G06F 16/9537; G06F 16/9024; G06F 16/24578; G06F 16/9535; G06Q 50/01; H04L 63/20; H04I 67/306; G06N 20/00
See application file for complete search history.

(56) References Cited

U.S. PATENT DOCUMENTS

2013/0080922 A1\* 3/2013 Elias ................... G06Q 10/1095
                                                              715/753
2016/0147893 A1\* 5/2016 Mashiach .............. G06Q 50/01
                                                              707/710

\* cited by examiner

*Primary Examiner* — Hau H Hoang
(74) *Attorney, Agent, or Firm* — Krishnendu Gupta; Deepika Bhayana; Derek Lam

(57) ABSTRACT

As an example, a server hosting a search engine may receive a search query and determine a searched time interval, a searched object, and a searched event. The server may select, based on the searched time interval, a portion of an object-event bipartite graph that was created using information gathered from social media sites. The server may compare attributes of individual events in the portion with attributes of the searched event to identify a set of relevant events. The server may determine objects associated with the relevant events and compare attributes of individual objects with the attributes of the searched object to identify a set of relevant objects. The search engine may provide search results that include the set of relevant objects ordered according to their similarity to the searched object.

20 Claims, 7 Drawing Sheets

```
                    400
                      ↘

┌─────────────────────────────────────┐
        │        TOP K-EVENTS 302             │
        └─────────────────────────────────────┘
                         │
        ┌─────────────────────────────────────┐
        │      OBJECT-EVENT SEARCH 402        │
        └─────────────────────────────────────┘
```

 DETERMINE OBJECTS ASSOCIATED WITH TOP K-EVENTS

OBJECT-RELEVANT EVENT TABLE (ORET) 404

|              | EVENT 214(A) | EVENT 214(B) | ••• | EVENT 214(K) |
|--------------|--------------|--------------|-----|--------------|
| OBJECT 406(1)| 1            | 0            |     | 1            |
| OBJECT 406(2)| 1            | 1            |     | 1            |
| •••          | •••          | •••          | ••• | •••          |
| OBJECT 406(S)| 0            | 0            |     | 1            |

REDUCED OBJECT-EVENT TABLE (ROET) 408

|              | EVENT 214(A) | EVENT 214(B) | ••• | EVENT 214(K) |
|--------------|--------------|--------------|-----|--------------|
| OBJECT 406(1)| 1            | 0            |     | 1            |
| •••          | •••          | •••          | ••• | •••          |
| OBJECT 406(T)| 1            | 1            |     | 1            |

0<T<S

```
        ┌─────────────────────────────────────┐
        │       RELEVANT OBJECTS 410          │
        │  ┌──────────────┐   ┌──────────────┐│
        │  │OBJECT 406(1) │•••│OBJECT 406(T) ││
        │  └──────────────┘   └──────────────┘│
        └─────────────────────────────────────┘
```

FIG. 4

500
REDUCED OBJECT-EVENT TABLE (ROET) 408
|  | EVENT 214(A) | EVENT 214(B) | ••• | EVENT 214(K) |
|---|---|---|---|---|
| OBJECT 406(1) | 1 | 0 |  | 1 |
| ••• | ••• | ••• | ••• | ••• |
| OBJECT 406(T) | 1 | 1 |  | 1 |
OBJECT FINDER 126
TOP T-OBJECTS 502
SIMILARITY SCORING 128
|  | ATTRIBUTE 208(1) | ATTRIBUTE 208(2) | ••• | ATTRIBUTE 208(L) | SIMILARITY SCORE 504 |
|---|---|---|---|---|---|
| OBJECT 406(1) | 1 | 1 |  | 1 | 99% |
| OBJECT 406(2) | 1 | 0 |  | 1 | 97% |
| ••• | 0 | 1 |  | 1 | 96% |
| OBJECT 406(T) | 1 | 0 |  | 0 | 93% |
RESULTS (E.G., ORDERED LIST) 130
| OBJECT 132(1) | ••• | OBJECT 132(T) |
FIG. 5

EVENT-BASED SEARCH ENGINE

BACKGROUND OF THE INVENTION

Field of the Invention

This invention relates generally to searching and more particularly to event-based searching.

DESCRIPTION OF THE RELATED ART

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

When performing a search for an object, such as a person, an image search using facial recognition may not yield many results, especially if there are relatively few pictures of the person.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

As an example, a server hosting a search engine may receive a search query and determine a searched time interval, a searched object, and a searched event. The server may select, based on the searched time interval, a portion of an object-event bipartite graph that was created using information gathered from social media sites. The server may compare attributes of individual events in the portion with attributes of the searched event to identify a set of relevant events. The server may determine objects associated with the relevant events and compare attributes of individual objects with the attributes of the searched object to identify a set of relevant objects. The search engine may provide search results that include the set of relevant objects ordered according to their similarity to the searched object.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

FIG. 4 is a block diagram of a system to create a reduced size object-event table, according to some embodiments.

FIG. 5 is a block diagram of a system to rank objects based on attributes of each object, according to some embodiments.

DETAILED DESCRIPTION

Figure 1:
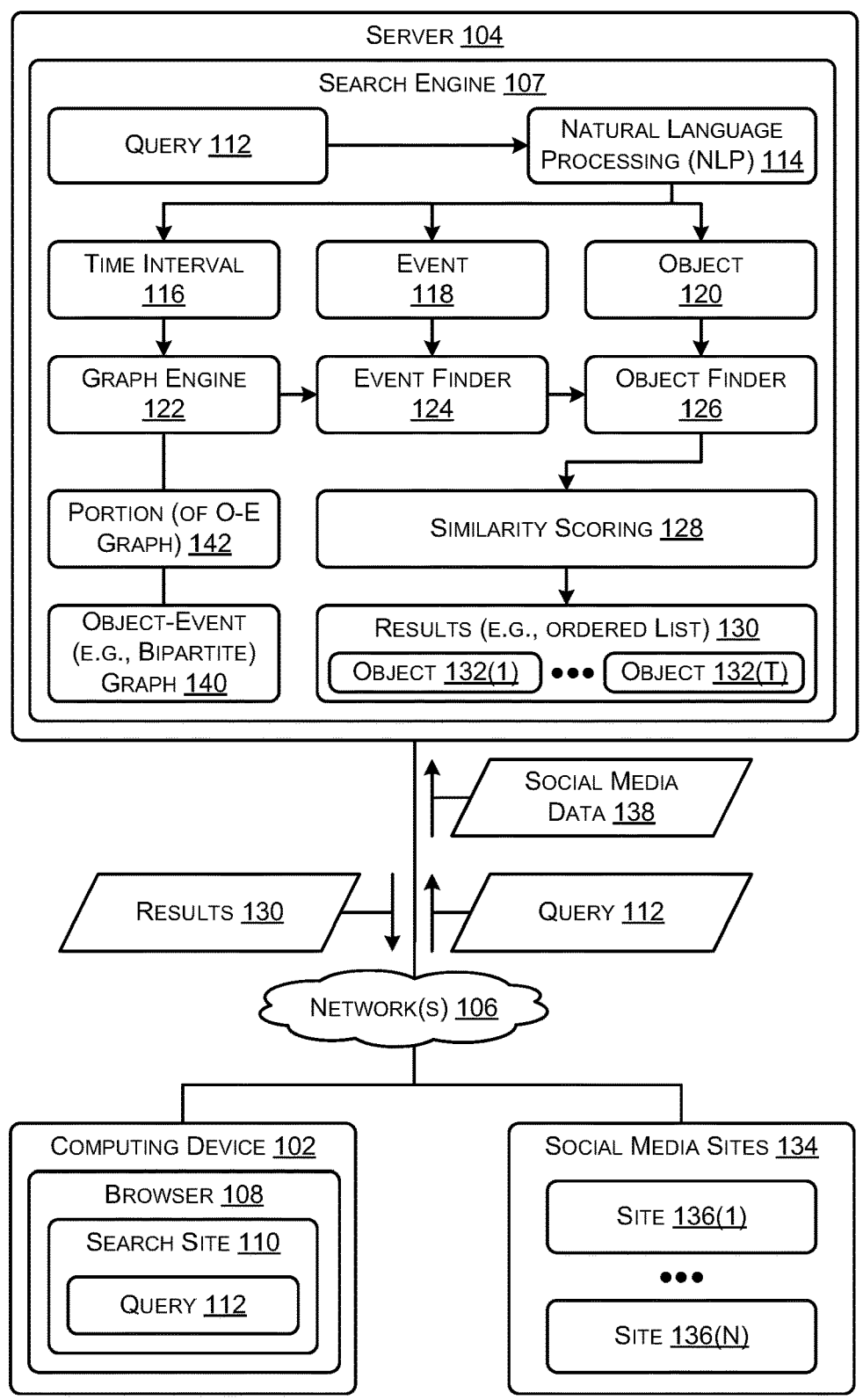
FIG. 1 is a block diagram of a system that includes a server to receive a search query and return search results, according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein enable an IHS to perform a search for an object, such as a person. While the examples provided herein use a person as the object, a search may be performed for any type of object (e.g., besides a person). The search query may request the search engine identify an object seen during a particular time period at a particular event. For example, the search query may be "Who dressed up as a peacock for the Metropolitan Museum of Art Gala ("Met Gala") in 2019?" The search engine may use natural language processing to determine, based on the search query, (i) a time period (e.g., 2019), (ii) an event (e.g., Met Gala), and (iii) an object (e.g., person(s) who wore a peacock costume).

The search engine determines events that occurred during the specified time frame to narrow the results. In this example, the Met Gala occurred on May 6, 2019. If the search query specified "gala" rather than "Met Gala", then the search engine may identify all gala-type events that occurred in 2019. The search engine identifies people that attended the event (e.g., Met Gala 2019) and looks at various attributes of each person, including a description of their clothing. The search engine may rank each person according to their attributes, with a higher weighting being given to attributes mentioning a peacock, a bird, or the like. For example, the search results may include a first person that includes a costume with peacock feathers may be ranked first, a second person wearing a costume with bird feathers may be ranked second, a third person wearing a costume that has a fan-like tail (similar to a peacock) may be ranked third and so on. Thus, a search engine that operates as described herein can answer search queries such as, for example, "Who was the presenter on cybersecurity at the recent IEEE symposium held at the University of Chicago?", "Who was the caterer for the meal at the wedding of John Smith and Jane Jones?" and so on.

As an example, a server may include one or more processors, and one or more non-transitory computer readable media to store instructions executable by the one or more processors to perform various operations. For example, the operations may include receiving a search query and determining, based on the search query, (i) a searched time interval, (ii) a searched object, and (iii) a searched event. The operations may include selecting a portion of an object-event graph derived from information gathered from a plurality of social media sites. For example, each event in the portion of the object-event graph may occur within the searched time interval. The operations may include determining, in the portion of the object-event graph, a set of relevant events that are similar to the searched event. For example, determining, in the portion of the object-event graph, the set of relevant events that are similar to the searched event may include performing a comparison of event attributes of individual events in the portion of the object-event graph to the event attributes of the searched event, determining, using a Naïve-Bayes classifier and based on the comparison, an event similarity score associated with individual events, and selecting the set of relevant events from the portion of the object-event graph based on the event similarity score. For example, determining, based on the one or more objects, the set of relevant objects that are similar to the searched object may include performing a comparison of object attributes of individual objects in the set of relevant objects to the object attributes of the searched object, determining, using a Naïve-Bayes classifier and based on the comparison, an object similarity score associated with individual objects, and selecting the set of relevant objects based on the object similarity score. For example, if the object is a person, the object attributes may include at least one of: a name of the person, an age of the person, a job title of the person, a company where the person works, a hair color of the person, an eye color of the person, or an attire of the person. The operations may include determining one or more objects associated with individual relevant events in the set of relevant events. The operations may include determining, based on the one or more objects, a set of relevant objects that are similar to the searched object. The operations may include sending search results including the set of relevant objects. The set of relevant objects in the search results may be ordered according to a similarity of individual relevant objects to the searched object.

FIG. 1 is a block diagram of a system 100 that includes a server to receive a search query and return search results, according to some embodiments. The system 100 includes a computing device 102 coupled to a server 104 via at least one network 106. The computing device 102 may include a browser 108. A user may navigate the browser 108 a search site 110 and enter a query 112. The query 112 may be sent from the computing device 102 across the network 106 to the server 104.

The server 104 may host a search engine 107 that receives the query 112 and uses natural language processing (NLP) 114 to process the query. The natural language processing 114 may use various techniques, including identifying parts of speech, to extract a time interval 116 (e.g., searched time interval), an event 118 (e.g., searched event), and an object 120 (e.g., searched object), from the query 112. The server 104 may include an object-event graph 140 created based on social media data 138 received and/or retrieved from social media sites 134, such as a site 136(1) to a site 136(N). For example, the server 104 may receive the social media data 138 based on a subscription model (e.g., the social media data 138 is pushed from the social media sites 134 to the server 104), based on scraping the social media sites 134 (e.g., the social media data 138 is pulled from the social media sites 134 by the server 104), or a combination thereof.

A graph engine 122 may extract a portion 142 of the object-event graph 140 based on the time interval 116. An event finder 124 may identify events in the portion 142 based on a similarity of the events to the event 118. Objects in the similar events may be ranked, e.g., using similarity scoring module 128, according to their similarity to the object 120 using an object finder 126 to create results 130. The similarity scoring module 128 may use machine learning, such as, for example, Naïve Bayes, Logistic regression, Neural Networks, Boosted Trees, Random Forest, or the like. In a preferred embodiment, the similarity scoring module 128 may use Naïve Bayes machine learning.

Naïve Bayes is a type of probabilistic classifier based on applying Bayes' theorem with strong (naïve) independence assumptions between the features. Naïve Bayes classifiers are highly scalable, requiring a number of parameters linear in the number of variables (features/predictors) in a learning problem. Maximum-likelihood training can be done by evaluating a closed-form expression, which takes linear time, rather than by expensive iterative approximation as used for many other types of classifiers. In Naïve Bayes, the algorithm assigns class labels to problem instances, represented as vectors of feature values, where the class labels are drawn from some finite set. The Naive Bayes classifier assumes that the value of a particular feature is independent of the value of any other feature, given the class variable. An advantage of naive Bayes is that it only requires a small number of training data to estimate the parameters necessary for classification.

The results 130 may include an ordered list of objects 132(1) to 132(T) that are ranked according to the similarity of the objects 132 to the object 120. For example, the object 132(1) may have a highest similarity score of the objects 132 relative to the object 120 while the object 132(T) may have a lower similarity score than the object 132(1). Thus, the results 130 may be ordered in descending similarity ranking to the object 120. The server 104 may send the results 130 to the computing device 102 via the network 106. The search site 110 may display the results 130 along with the query 112.

Thus, a user may browse to a search site and send a query to a search engine hosted by a server. The search engine may parse the query to determine a time interval, and the event, and an object to be identified. A graph engine may extract a portion of an object-event graph based on the time interval.

An event finder may identify events in the object-event graph that are similar to the event in the query. The objects in the most relevant events may be ranked according to their similarity to the object identified in the query and the results provided to the computing device. In this way, a user can perform a search to identify an object, such as a person, based on where the object was located at a particular point in time. The event-based search engine described herein can be used for many different purposes, including talent acquisition (e.g., recruiting a speaker at a conference as an expert in a particular field), validating an applicant's resume, identifying potential sales opportunities and the like.

Figure 2:
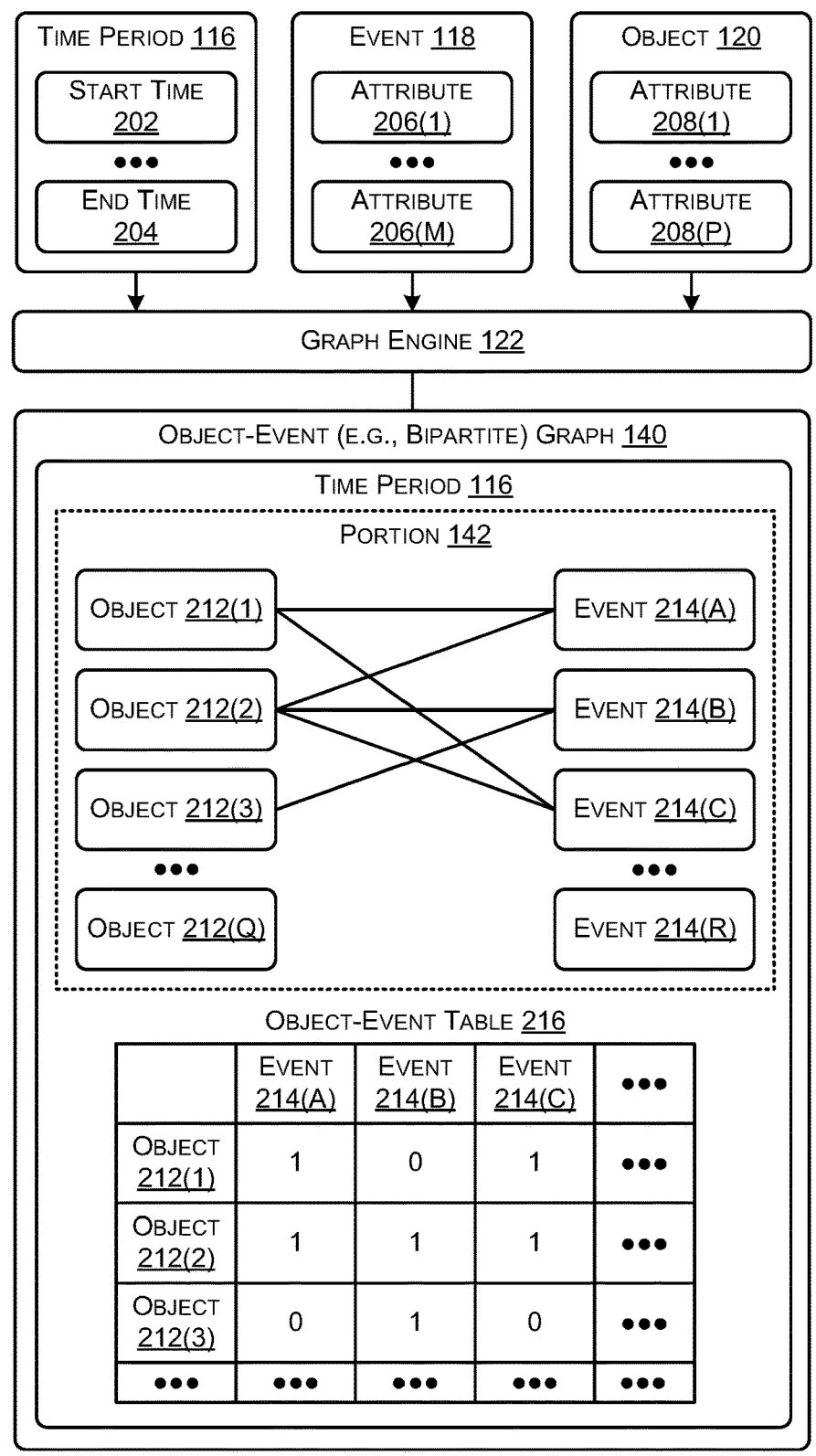
FIG. 2 is a block diagram of a system to extract an object-event graph for a particular time period, according to some embodiments.

FIG. 2 is a block diagram of a system 200 to extract an object-event graph for a particular time period, according to some embodiments. The time period 116 may include a start time 202 and an end time 204. In some cases, the end time 204 may be the same as the start time 202. For example, if the search query is searching for a particular day then the start day and the end day may be the same.

The event 118 may include multiple attributes, such as an attribute 206(1) to an attribute 206(M) (M>0). For example, the attributes 206 may include a name of an event, a location (e.g., street number and name, city, state, and the like) of an event, a venue (e.g., Carnegie Hall, The Kennedy Center, and the like) associated with the event, a size of the event, a description (e.g., concert, career fair, workshop, gala, dinner, training, continuing education) of the event, a sponsor (e.g., Institute of Electrical and Electronics Engineers (IEEE), American Bar Association (ABA), a University, a Corporation, or the like), and other attributes.

The object 120 may include multiple attributes, such as an attribute 208(1) to an attribute 208(P) (P>0). For example, when the object 120 is a person, the attributes 208 may include a name of the person, an age of the person, a job title of the person, a company where the person works, a hair color of the person, an eye color of the person, an attire of the person, and other attributes of the person. As another example, when the object 120 is food, the attributes 208 may include an ethnicity (e.g., Italian, Mexican, Indian, or the like) of the food, ingredients (e.g., type of meat, type of vegetables, and the like) of the food, type (e.g., appetizer, main dish, desert, and the like), the spicing (e.g., spicy hot, bland, and the like) of the food, a temperature (e.g., hot, cold, or the like) of the food, salty or sweet, and other attributes of the food.

Based on the time period 116 (e.g., that was extracted from the query 112 of FIG. 1), the graph engine 122 may extract the portion 142 of the object event graph 140. The portion 142 may include a bipartite graph of objects and events, as illustrated in FIG. 2, that occurred within the time period 116. For example, the portion 142 may include objects 212(1), 212(2), 212(3), to 212(Q) (Q>0) and events 214(A), 214(B), 214(C), to 214(R) (R>0, Q not necessarily equal to R). In the bipartite graph of the portion 142, each line between one of the objects 212 and one of the events 214 indicates a connection between an object and an event (e.g., the object was present at the event). For example, as illustrated in FIG. 2, the object 212(1) was present at (or associated with) events 214(A) and 214(C), the object 212(2) was present at events 214(A), 214(B), and 214(C), and the object 212(3) was present at event 214(C). The portion 142 may be depicted as a table, such as an object-event table 216, in which a "1" indicates a connection and a "0" indicates no connection between an object and an event.

Figure 3:
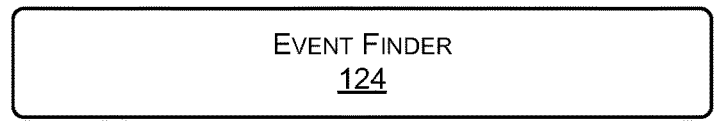
FIG. 3 is a block diagram of a system to rank events based on attributes of each event, according to some embodiments.

FIG. 3 is a block diagram of a system 300 to rank events based on the attributes 206 of each event, according to some embodiments. In the system 300, the event finder may analyze the events 214 that were identified in the portion 142 by comparing the attributes 206 of each of the events 214 in the portion 142 with attributes of the event 118 (e.g., that was derived from the query 112). Based on comparing the attributes 206 of each of the events 214 with the attributes of the event 118, the similarity scoring module 128 may determine a similarity score 304 associated with each of the events 214. The similarity score 304 may indicate (e.g., as a percentage) how similar each of the events 214 is to the event 118. The event finder 124 may select the top K events (e.g., a set of one or more events) where K is greater than zero. In this way, the number of events being analyzed is reduced further.

FIG. 4 is a block diagram of a system 400 to create a reduced size object-event table, according to some embodiments. An object-event search 402 may be performed to identify objects associated with the top K events 302. The top K-events 302 includes those events that are most similar, in terms of attributes, to the event 118 from the search query. Thus, the most relevant events (e.g., top K-events 302) are analyzed using the object event search 402 to identify S objects (e.g., a set of one or more objects), e.g., objects 406(1) to 406(S) (where S>0), that were present at (e.g., associated with) the top K-events 302 to create an object-relevant event table 404. The object-relevant event table 404 indicates the objects 406(1) to 406(S) that were associated with (present at) the relevant events 214.

The objects 406(1) to 406(S) that have less than a threshold amount of associations with the top K-events 302 may be discarded to create a reduced object-event table 408 that includes T objects (e.g., a set of one or more objects), e.g., objects 406(1) to 406(T), where 0<T<S. For example, if K=10 and S=20, those objects that were present at 2 or fewer events may be discarded. In this example, assume 5 objects were present at 2 or fewer events and are discarded, thus T=15. The objects 406(1) to 406(S) that have less than a threshold amount of associations with the top K-events 302 may be discarded because they are likely not relevant. In this way, a set of relevant objects 410 that includes the objects 406(1) to 406(T) may be created. The objects 406(1) to 406(T) have more than a threshold amount of associations with the top K-events 302.

FIG. 5 is a block diagram of a system 500 to rank objects based on attributes of each object, according to some embodiments. The object finder 126 may analyze the objects in the reduced object-event table 408 by comparing multiple attributes of each of the objects 406(1) to 406(T) with attributes of the object 120 from the query to determine top T-objects 502. The object finder 126 may determine a similarity score 504 that expresses as a percentage the similarity between one of the objects 406 and the object 120 based on the attributes 208. The object finder 126 may order the objects from the highest similarity score 504 down to create the results 130 that include the objects 132.

Figure 6:
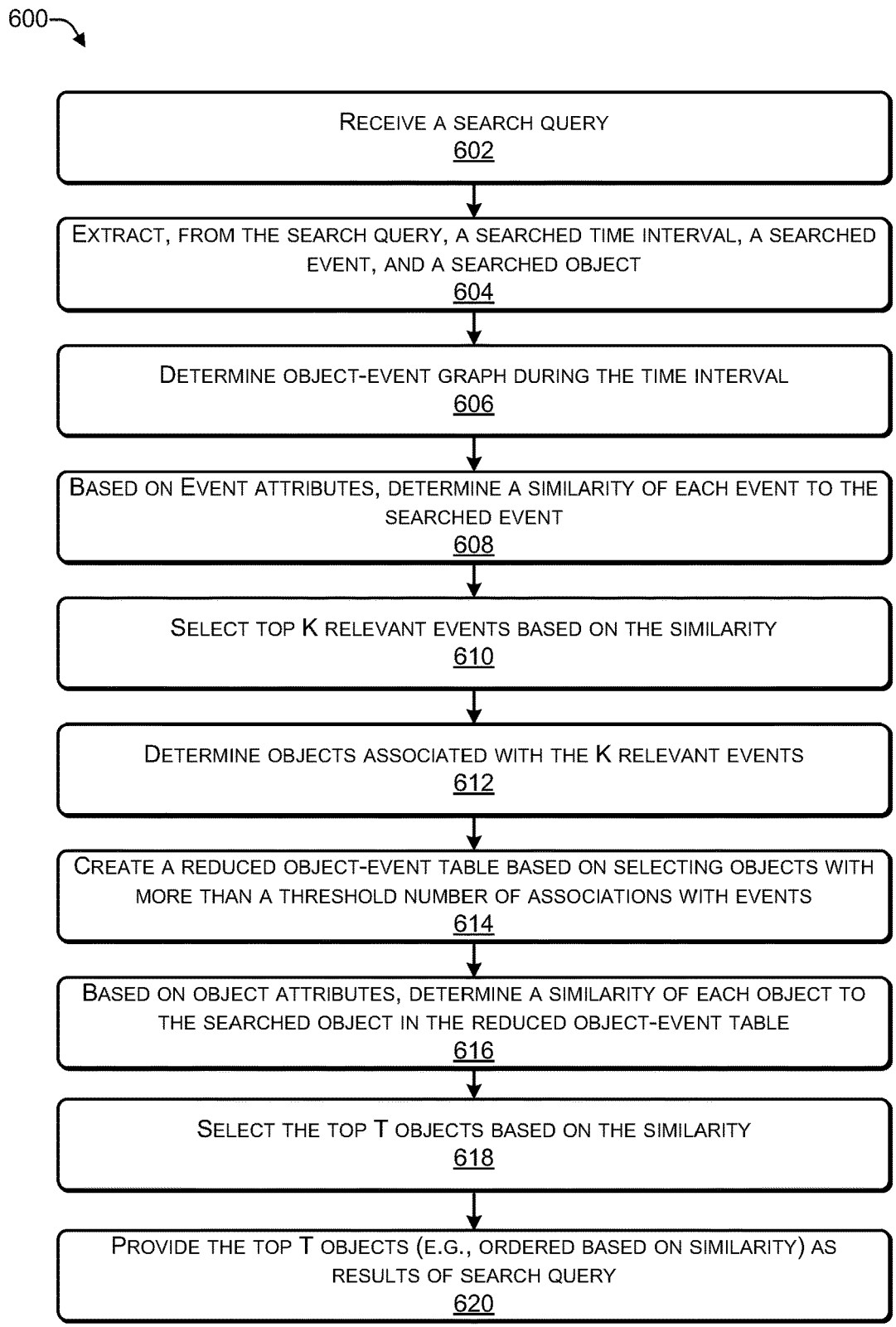
FIG. 6 is a flowchart of a process that includes providing search results that include a number of objects similar to an object in a search query, according to some embodiments.

In the flow diagram of FIG. 6, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 600 is described with reference to FIGS. 1, 2, 3, 4, and 5 as described above, although other models, frameworks, systems and environments may be used to implement these processes.

FIG. 6 is a flowchart of a process that includes providing search results that include a number of objects similar to an object in a search query, according to some embodiments. For example, the process 400 may be performed by the search engine 107 of FIG. 1.

At 602, the process may receive a search query. At 604, the process may extract, from the search query, a search time interval, a searched event, and a searched object. For example, in FIG. 1, the search engine 107 may receive the query 112. The search engine 107 may use the natural language processing 114 to extract the time interval 116, the event 118, and the object 120 from the query 112.

At 606, the process may determine an object-event graph during the time interval. For example, in FIG. 2, the graph engine 122 may be used to select the portion 142 of the object event graph 140. The portion 142 may include the objects 212(1) to 212(Q) and the events 214(1) to 214(2) (Q>0, R>0) that occurred within the time period 116.

At 608, the process may, based on attributes of each event, determine a similarity of each event to the searched event. At 610, the process may select the top K relevant events based on the similarity. For example, in FIG. 3, the event finder 124 may determine the attributes of the event 118 and compare the attributes of each of the events 214 with the attributes of the event 118. The similarity scoring module 128 may be used to determine the similarity score 304 associated with each of the events 214 in the top K events 302.

At 612, the process may determine objects associated with the K relevant events. At 614, the process may create a reduced object event table based on selecting objects with more than a threshold number of associations with the K relevant events. For example, in FIG. 4, the object event search 402 may identify objects associated with the top K events to create the object-relevant event table 404. Those objects with less than a predetermined number of associations with the events 214 may be removed to create the reduced object event table 408.

At 616, the process may, based on object attributes, determine a similarity of each object in the reduced object event table to the searched object. At 618, the process may select the top T objects based on the similarity to the searched object. For example, in FIG. 5, the object finder 126 may determine the top T objects 502 based on comparing the attributes of each of the objects 406 with the attributes of the object 120 and determining the similarity score 504 (e.g., using the similarity scoring module 128).

At 620, the top T objects may be provided in an order based on similarity as results of the search query. For example, in FIG. 5, the search engine 107 may provide the results 130 that include the objects 132(1) to object 132(T) ordered (e.g., descending order with the most similar object first, followed by the next most similar object, and so on) according to the similarity score 504.

Figure 7:
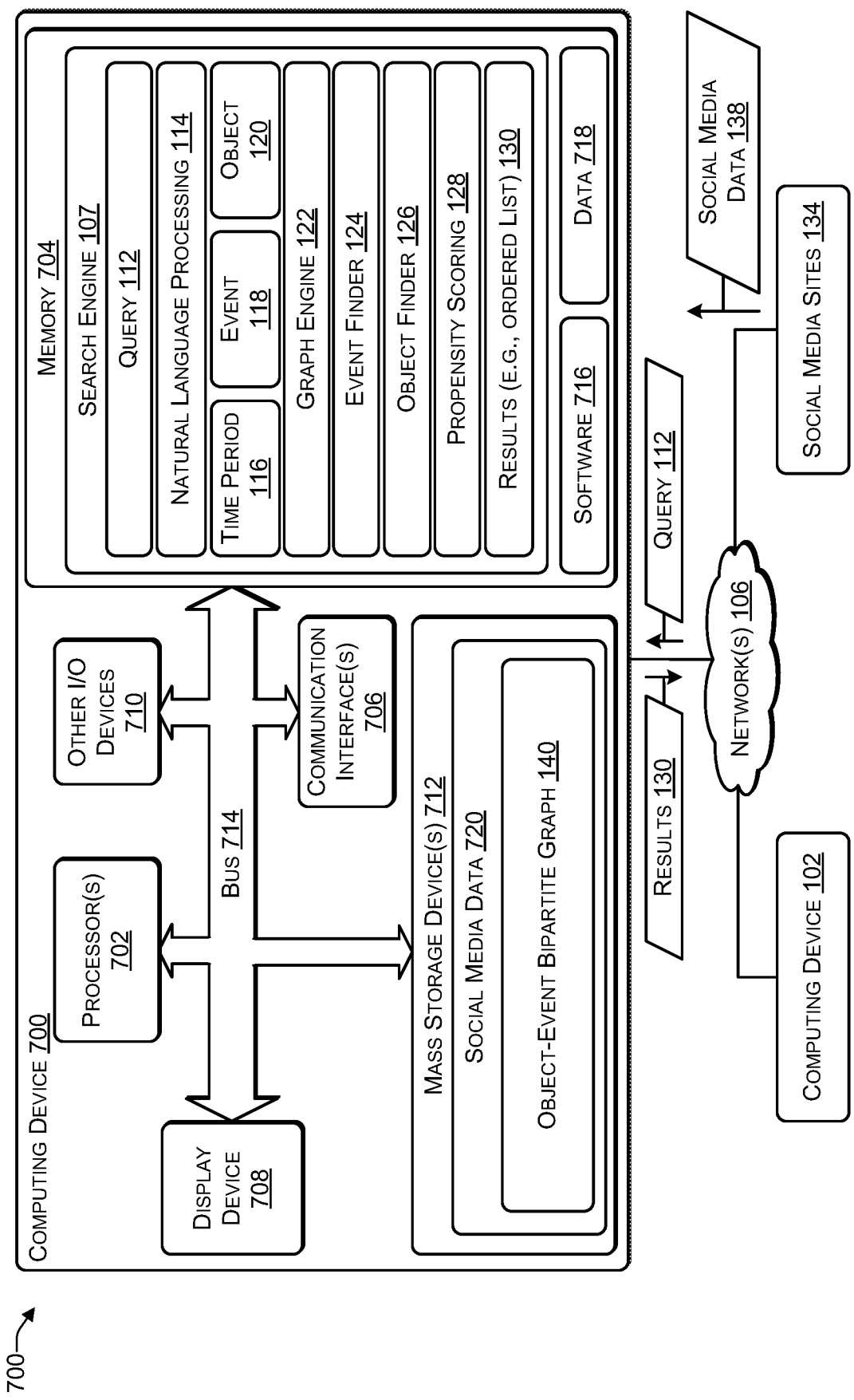
FIG. 7 illustrates an example configuration of a computing device that can be used to implement the systems and techniques described herein.

FIG. 7 illustrates an example configuration of a computing device 700 that can be used to implement the systems and techniques described herein, such as for example, the search engine 107 of FIG. 1.

The computing device 700 may include one or more processors 702 (e.g., including a CPU, a graphics processing unit (GPU), or the like), a memory 704, communication interfaces 706, a display device 708, other input/output (I/O) devices 710 (e.g., a keyboard, a trackball, and the like), and one or more mass storage devices 712 (e.g., disk drive, solid state disk drive, or the like), configured to communicate with each other, such as via one or more system buses 714 or other suitable connections. While a single system bus 714 is illustrated for ease of understanding, it should be understood that the system buses 714 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 702 are one or more hardware devices that may include a single processing unit or a number of processing units, all of which may include single or multiple computing units or multiple cores. The processors 702 may include a graphics processing unit (GPU) that is integrated with a CPU or the GPU may be a separate processor device from the CPU. The processors 702 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 702 may be configured to fetch and execute computer-readable instructions stored in the memory 704, mass storage devices 712, or other computer-readable media.

Memory 704 and mass storage devices 712 are examples of computer storage media (e.g., memory storage devices) for storing instructions that can be executed by the processors 702 to perform the various functions described herein. For example, memory 704 may include both volatile memory and non-volatile memory (e.g., RAM, ROM, or the like) devices. Further, mass storage devices 712 may include hard disk drives, solid-state drives, removable media, including external and removable drives, memory cards, flash memory, floppy disks, optical disks (e.g., CD, DVD), a storage array, a network attached storage, a storage area network, or the like. Both memory 704 and mass storage devices 712 may be collectively referred to as memory or computer storage media herein and may be any type of non-transitory media capable of storing computer-readable, processor-executable program instructions as computer program code that can be executed by the processors 702 as a particular machine configured for carrying out the operations and functions described in the implementations herein.

The computing device 700 may include one or more communication interfaces 706 for exchanging data via the network 106. The communication interfaces 706 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 706 can also provide communication with external storage, such as a storage array, network attached storage, storage area network, cloud storage, or the like.

The display device 708 may be used for displaying content (e.g., information and images) to users. Other I/O devices 710 may be devices that receive various inputs from a user and provide various outputs to the user, and may include a keyboard, a touchpad, a mouse, a printer, audio input/output devices, and so forth.

The computer storage media, such as memory 704 and mass storage devices 712, may be used to store software and data. For example, the computer storage media may be used to store the search engine 107, software 716 (e.g., operating system, drivers, other software applications), and data 718.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving, by one or more processors, a search query;
determining, by the one or more processors and based on the search query, a searched time interval;
determining, by the one or more processors and based on the search query, a searched object;
determining, by the one or more processors and based on the search query, a searched event;
selecting, by the one or more processors, a portion of an object-event graph derived from information gathered from a plurality of social media sites;
determining, by the one or more processors, in the portion of the object-event graph, a set of relevant events that are similar to the searched event;
determining, by the one or more processors, one or more objects associated with individual relevant events in the set of relevant events;
determining, by the one or more processors and based on the one or more objects, a set of relevant objects that are similar to the searched object, the determination comprising:
performing a comparison of object attributes of individual objects in the set of relevant objects to the object attributes of the searched object;
determining, using a Naïve Bayes classifier, an object similarity score associated with individual objects; and
selecting the set of relevant objects based on the object similarity score; and
sending, by the one or more processors, search results including the set of relevant objects.

2. The method of claim 1, wherein determining, in the portion of the object-event graph, the set of relevant events that are similar to the searched event comprises:
performing a comparison of event attributes of individual events in the portion of the object-event graph to the event attributes of the searched event;
determining, based on the comparison, an event similarity score associated with individual events; and
selecting the set of relevant events from the portion of the object-event graph based on the event similarity score.

3. The method of claim 2, wherein determining, based on the comparison, the event similarity score associated with individual events comprises:
determining, using a Naïve-Bayes classifier, the event similarity score associated with individual events.

4. The method of claim 1 wherein:
the object comprises a person; and
the object attributes comprise at least one of:
a name of the person,
an age of the person,
a job title of the person,
a company where the person works,
a hair color of the person,
an eye color of the person, or
an attire of the person.

5. The method of claim 1, wherein:
each event in the portion of the object-event graph occurs within the searched time interval.

6. The method of claim 1, wherein:
the set of relevant objects in the search results are ordered according to a similarity of individual relevant objects to the searched object.

7. The method of claim 1, wherein determining the searched time interval comprises identifying the time interval based on the search query using natural language processing.

8. A server comprising:
one or more processors; and
one or more non-transitory computer readable media to store instructions executable by the one or more processors to perform operations comprising:
receiving a search query;
determining, based on the search query, a searched time interval;
determining, based on the search query, a searched object;
determining, based on the search query, a searched event;
selecting a portion of an object-event graph derived from information gathered from a plurality of social media sites;

determining, in the portion of the object-event graph, a set of relevant events that are similar to the searched event;

determining one or more objects associated with individual relevant events in the set of relevant events;

determining, based on the one or more objects, a set of relevant objects that are similar to the searched object, the determination comprising:

performing a comparison of object attributes of individual objects in the set of relevant objects to the object attributes of the searched object;

determining, using a Naïve Bayes classifier, an object similarity score associated with individual objects; and selecting the set of relevant objects based on the object similarity score; and sending search results including the set of relevant objects.

9. The server of claim 8, wherein determining, in the portion of the object-event graph, the set of relevant events that are similar to the searched event comprises:

performing a comparison of event attributes of individual events in the portion of the object-event graph to the event attributes of the searched event;

determining, based on the comparison, an event similarity score associated with individual events; and selecting the set of relevant events from the portion of the object-event graph based on the event similarity score.

10. The server of claim 9, wherein determining, based on the comparison, the event similarity score associated with individual events comprises:

determining, using a Naïve-Bayes classifier, the event similarity score associated with individual events.

11. The server of claim 8, wherein:
the object comprises a person; and
the object attributes comprise at least one of:
a name of the person,
an age of the person,
a job title of the person,
a company where the person works,
a hair color of the person,
an eye color of the person, or
an attire of the person.

12. The server of claim 8, wherein:
each event in the portion of the object-event graph occurs within the searched time interval.

13. The server of claim 8, wherein:
the set of relevant objects in the search results are ordered according to a similarity of individual relevant objects to the searched object.

14. The server of claim 8, wherein determining the searched object comprises identifying the object based on the search query using natural language processing.

15. One or more non-transitory computer readable media to store instructions executable by the one or more processors to perform operations comprising:
receiving a search query;
determining, based on the search query, a searched time interval;
determining, based on the search query, a searched object;

determining, based on the search query, a searched event;
selecting a portion of an object-event graph derived from information gathered from a plurality of social media sites;
determining, in the portion of the object-event graph, a set of relevant events that are similar to the searched event, the determination comprising:

performing a comparison of event attributes of individual events in the portion of the object-event graph to the event attributes of the searched event;

determining, using a Naïve-Bayes classifier and based on the comparison, an event similarity score associated with individual events; and selecting the set of relevant events from the portion of the object-event graph based on the event similarity score;

determining one or more objects associated with individual relevant events in the set of relevant events;

determining, based on the one or more objects, a set of relevant objects that are similar to the searched object; and sending search results including the set of relevant objects.

16. The one or more non-transitory computer readable media of claim 15, wherein determining, based on the one or more objects, the set of relevant objects that are similar to the searched object comprises:

performing a comparison of object attributes of individual objects in the set of relevant objects to the object attributes of the searched object;

determining, using a Naïve-Bayes classifier and based on the comparison, an object similarity score associated with individual objects; and selecting the set of relevant objects based on the object similarity score.

17. The one or more non-transitory computer readable media of claim 16, wherein:
the object comprises a person; and
the object attributes comprise at least one of:
a name of the person,
an age of the person,
a job title of the person,
a company where the person works,
a hair color of the person,
an eye color of the person, or
an attire of the person.

18. The one or more non-transitory computer readable media of claim 15, wherein:
each event in the portion of the object-event graph occurs within the searched time interval.

19. The one or more non-transitory computer readable media of claim 15, wherein:
the set of relevant objects in the search results are ordered according to a similarity of individual relevant objects to the searched object.

20. The one or more non-transitory computer readable media of claim 15, wherein determining the searched event comprises identifying the event based on the search query using natural language processing.

* * * * *